United States Patent
Kia et al.

(10) Patent No.: US 7,622,069 B1
(45) Date of Patent: Nov. 24, 2009

(54) MOLDING METHODS USING SHAPE MEMORY POLYMERS

(75) Inventors: Hamid G. Kia, Bloomfield Hills, MI (US); Ingrid A. Rousseau, Clinton Township, MI (US); Elisabeth J. Berger, Farmington Hills, MI (US); John N. Owens, Franklin, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/277,015

(22) Filed: Nov. 24, 2008

(51) Int. Cl.
*B28B 7/32* (2006.01)

(52) U.S. Cl. .................. 264/314; 264/230; 264/279; 264/313; 264/334

(58) Field of Classification Search .............. 264/230, 264/313, 314, 271.1, 279, 279.1, 334
See application file for complete search history.

(56) References Cited

U.S. PATENT DOCUMENTS

| | | | |
|---|---|---|---|
| 2,886,853 A * | 5/1959 | Herman et al. ............... 264/535 |
| 5,160,671 A * | 11/1992 | Satoh ....................... 264/36.16 |
| 6,071,460 A * | 6/2000 | Renaudin et al. ............. 264/314 |
| 6,576,165 B2 | 6/2003 | Aloisio et al. |
| 7,422,714 B1 | 9/2008 | Hood et al. |
| 2002/0012765 A1 * | 1/2002 | Debalme et al. ............. 264/314 |
| 2007/0063383 A1 * | 3/2007 | Anthony et al. ............. 264/314 |

* cited by examiner

*Primary Examiner*—Joseph S. Del Sole
*Assistant Examiner*—Robert Dye
(74) *Attorney, Agent, or Firm*—Dierker & Associates, P.C.

(57) ABSTRACT

A molding method includes inserting a preform having a predetermined part shape into an external mold having the predetermined part shape. The preform has therein a perforated shape memory polymer mandrel in its temporary shape, and a bladder positioned within the perforated shape memory polymer mandrel. The shape memory polymer mandrel has i) the predetermined part shape as the temporary shape and ii) a shrunken shape as its permanent shape, wherein the shrunken shape is configured such that it is removable from the predetermined part shape. The method further includes configuring the bladder such that it substantially blocks perforations of the mandrel in its temporary shape, injecting resin into the external mold between an inner surface of the external mold and an outer surface of the preform such that the resin impregnates the preform, and curing the injected resin, thereby forming a molded part.

17 Claims, 5 Drawing Sheets

HEAT ($T > T_{SWM}$) AND
PRESSURE AND COOL ($T < T_{SWM}$) ↓

FIG. 2D

INJECT RESIN AND CURE
($T = T_C < T_{SWM}$) ↓

FIG. 2E

DEPRESSURIZE AND HEAT
($T > T_{SWM}$) AND REMOVE FROM MOLD ↓

HEAT ($T > T_{SWM}$)
AND PRESSURE

FIG. 4D

COOL ($T < T_{SWB}$)

FIG. 4E

INJECT RESIN AND CURE
($T = T_C < T_{SWB}$)

FIG. 4F

HEAT ($T > T_{SWM}$)
AND REMOVE FROM MOLD

MOLDING METHODS USING SHAPE MEMORY POLYMERS

TECHNICAL FIELD

The present disclosure relates generally to methods for molding using shape memory polymers.

BACKGROUND

There are many techniques for molding that involve the use of preforms. One example of such a technique is structural reaction injection molding (SRIM). However, preforms with complex or intricate shapes may be difficult and/or time consuming to manufacture. As such, costs and energy consumption of such manufacturing processes may be undesirably high. For an enclosed or tubular preform, for example, some techniques involve generating multiple pieces of a single preform screen separately, and then stapling or otherwise adhering the preform screen pieces together for subsequent processing.

In another example, preforming utilizes an articulated screen, which may also undesirably add to the cost of preforming. Furthermore, there may be some geometries, such as an S-shaped or otherwise curved tube with a non-constant cross-section, which are not amenable to being formed via these methods. Likewise, molding via traditional techniques may be unsuitable for forming parts with similar intricate part shapes.

SUMMARY

Various methods for molding using preforms are disclosed herein. One example of the method includes inserting a preform having a predetermined part shape into an external mold having the predetermined part shape. The preform has therein a perforated shape memory polymer mandrel in its temporary shape, and a bladder is positioned within the perforated shape memory polymer mandrel. The shape memory polymer mandrel has i) the predetermined part shape as the temporary shape and ii) a shrunken shape as its permanent shape, wherein the shrunken shape is configured such that it is removable from the predetermined part shape. The bladder is configured such that it substantially blocks perforations of the mandrel in its temporary shape. Resin is injected into the external mold between an inner surface of the external mold and an outer surface of the preform such that the resin impregnates the preform. The injected resin is cured, thereby forming a molded part.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Examples of the molding method disclosed herein utilize an assembly including at least a perforated shape memory polymer mandrel and a bladder therein. The perforated shape memory polymer mandrel is switchable between a predetermined part shape and a collapsed shape that is readily removable from the part shape. This enables complex shapes to be formed without resulting in die lock of the molded part. Furthermore, the bladder may be formed of a flexible material or a shape memory polymer. Either of these materials enables the bladder to advantageously block perforations of the mandrel during the molding processes.

As used herein, the phrase "predetermined part shape" refers to the desirable shape of the ultimately formed part. Generally, the predetermined part shape is any desirable simple or complex geometric shape that is configured such that a mandrel used in forming the part is removable from such shape. In the non-limiting examples shown in the Figures, the predetermined part shape is a tube having one or more curves or a non-constant cross-section. It is to be further understood that bladders and mandrels used in forming the part, and described as having the predetermined part shape, may be smaller in size than the actual part. In one example, a mandrel used to form the part would have the same shape as the resulting part; however the mandrel outer diameter would be equivalent to the outer diameter of the part minus the thickness the part. In another example, a shape memory bladder inside of a mandrel used to form the part would, in one of its two states, have the same shape as the resulting part; however the shape memory bladder outer diameter, in the state having the predetermined part shape, would be equivalent to the outer diameter of the part minus the thickness of both the part and the mandrel.

The mandrel (and in some instances, the bladder) disclosed herein may be suitable for forming a single complex part shape, or may be reconfigured one or more times such that a variety of different complex part shapes may be molded using the mandrel.

Figures 6A, 6B, 6C:
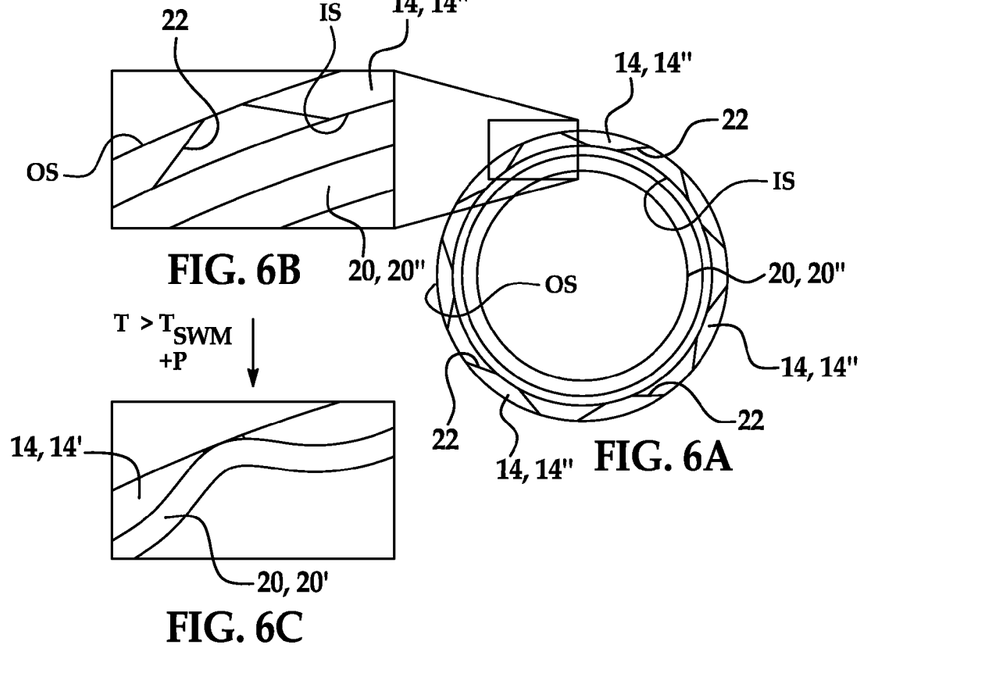
FIG. 6A is a cross-sectional view of the perforated shape memory polymer mandrel and a non-perforated bladder therein.
FIGS. 6B and 6C are enlarged views of a portion of the perforated shape memory polymer mandrel and the bladder of FIG. 6A before the bladder is deformed (FIG. 6B) and after the bladder is deformed (FIG. 6C).

Furthermore, it is to be understood that the mandrels disclosed herein are perforated mandrels. Such perforations are not shown in FIGS. 2A-2E and 4A-4D merely for clarity purposes. FIGS. 6A-6C do illustrate one example of the perforations. Beyond the illustrations in FIGS. 6A-6C, it is to be understood that the mandrel perforations may have any desirable geometry that aids in maintaining fibers on the mandrel during formation of the preform used in the molding processes disclosed herein.

Still further, when discussing heating and cooling of the shape memory polymer mandrels and bladder herein, it is to be understood that the temperature and time of exposure to such temperature depend, at least in part, on the shape memory polymer selected. Such polymers are thermally or otherwise activated shape memory polymers which may be returned from a deformed or temporary state to their original or permanent state via an external stimulus (e.g., direct heat or indirect heat using an electric field, a magnetic field, irradiation, a change in relative humidity, a change in solvation state, etc). Non-limiting examples of such shape memory polymers include epoxy-, acrylate-, styrene-, or olefin-based systems that may include fillers (e.g., inorganic fillers) or other active materials. It is to be understood that fillers may be reinforcing fillers, which improve the mechanical properties of the shape memory polymer.

Figure 1:
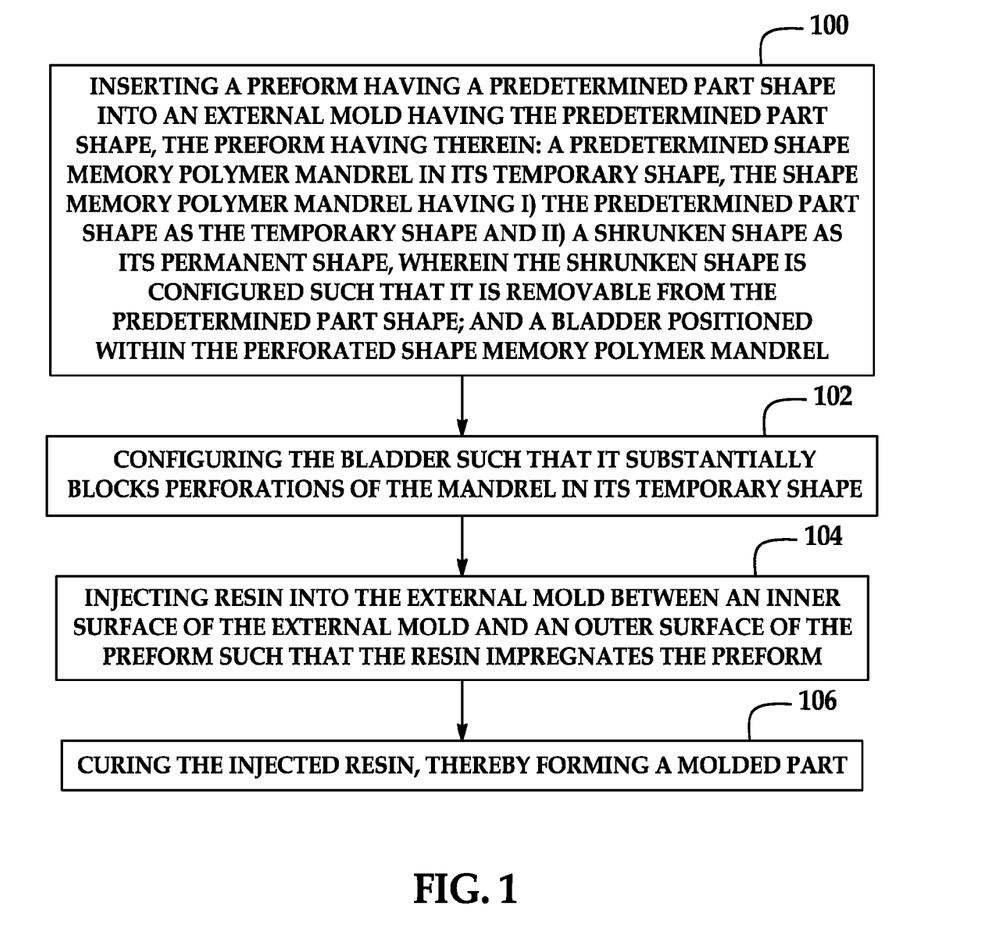
FIG. 1 is a flow diagram depicting an example of the method for molding using a preform and a perforated shape memory mandrel/bladder assembly therein.

Referring now to FIG. 1, a general example of the molding method is depicted as a flow diagram. It is to be understood that two non-limiting examples of such molding methods are discussed further hereinbelow in reference to the FIG. 2 and FIG. 4 series.

The molded part resulting from the method is made up of a cured resin that is impregnated into a preform. The preform is generally formed of fibers (e.g., glass fibers, carbon fibers, other reinforcing fibers or non-reinforcing fibers, or the like), and binder materials (e.g., epoxy powders, polyester emulsions, thermoplastic or cellulosic fibers, or the like), and/or any other desirable materials (e.g., clay platelets or nanotubes), which may be materials utilized in the preforming process. The preform may be formed via any suitable process, non-limiting examples of which are disclosed in U.S. patent application Ser. No. 12/276,983, filed concurrently herewith on Nov. 24, 2008, and some of which are briefly described hereinbelow.

As shown at reference numeral 100 in FIG. 1, the preform has inserted therein a perforated shape memory polymer mandrel in its permanent shape, and a bladder positioned within the shape memory polymer mandrel. The shape memory polymer mandrel generally has the predetermined part shape as the temporary shape and a shrunken shape as its permanent shape. The shrunken permanent shape is removable from the predetermined part shape.

The bladder is non-perforated and is formed of either a flexible material or a shape memory polymer material. It is to be understood that the bladder may be inserted into the mandrel, or may be maintained in the mandrel after both the mandrel and bladder are used to form the preform.

The preform with the mandrel (in its temporary shape) and the bladder therein are inserted into an external mold having the predetermined part shape, also as shown at reference numeral 100.

Generally, the method then includes configuring the bladder such that the perforations of the mandrel (in its temporary shape) are blocked, as shown at reference numeral 102. The configuring of the various bladders is described in further detail hereinbelow.

Resin is then injected (as at reference numeral 104) between an inner surface of the external mold and an outer surface of the preform such that the resin impregnates the preform. Non-limiting examples of suitable resins includes epoxies, polyesters, vinyl esters, or urethanes. Injection may be accomplished by any liquid molding method, including, but not limited to, structural reaction injection molding (SRIM), resin transfer molding (RTM), resin infusion, and variations of the previously listed techniques, such as vacuum-assisted RTM and injection-compression SRIM.

The injected, impregnated resin is then cured, as shown at reference numeral 106. It is to be understood that the curing temperature of the resin is generally less than the switching temperature of the mandrel, thereby ensuring that the mandrel is not prematurely reverted to its permanent shrunken shape. Curing the resin forms the molded part.

After curing, the molded part is removed from the external mold. A parting section for the external mold may be along a center axis of the part. This particular external mold configuration enables facile removal of the part. It is to be understood that the external mold may be configured in another suitable manner such that the part is readily removable therefrom.

The part having the mandrel and bladder therein may then be subjected to steps for reconfiguring the bladder such that the mandrel perforations are no longer blocked, and to steps for reverting the mandrel to its permanent shrunken shape. The mandrel and bladder are then removed from the part.

In some instances, the removed mandrel may have its temporary shape reset, or may be reshaped to set a new temporary shape using a forming die (not shown) and a suitable heating and cooling sequence.

Figures 2A, 2B, 2C:
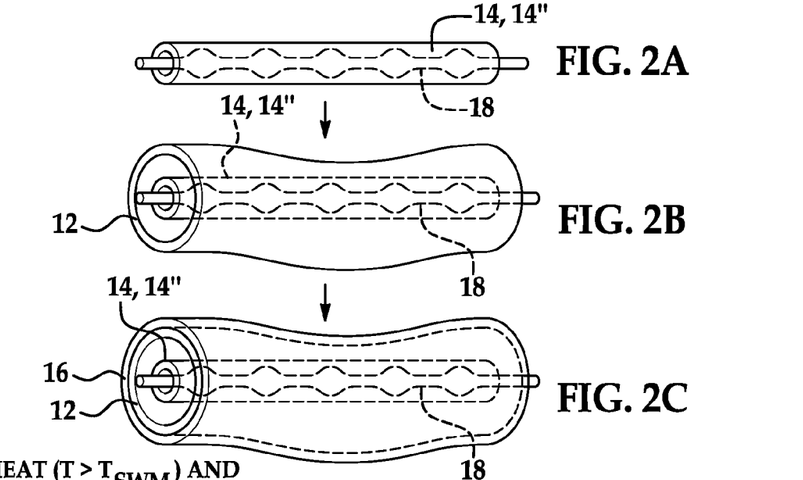
FIGS. 2A through 2H schematically depict an example of the method for molding using a preform having a perforated shape memory mandrel and a flexible bladder therein.

Referring now to FIGS. 2A through 2H, one example of molding with the mandrel 14 and a flexible bladder 18 is shown. As shown in FIG. 2A, the flexible bladder 18 may be positioned in the mandrel 14 when in its permanent shape 14". The flexible bladder 18 is generally non-porous and compliant. Non-limiting examples of suitable materials for the flexible bladder 18 include rubber, polychloroprene, nylon, polyisobutylene, or other like materials.

The mandrel 14, 14" having the bladder 18 therein is positioned within the preform 12, as shown in FIG. 2B. This assembly (preform 12, mandrel 14, 14" and bladder 18) is then positioned within an external mold 16 having the predetermined part shape, as shown in FIG. 2C. The external mold 16 dimensions are configured such that the preform 12 is able to fit therein, and such that resin may be injected into the mold 16 so that it impregnates the preform 12.

Figure 2D:
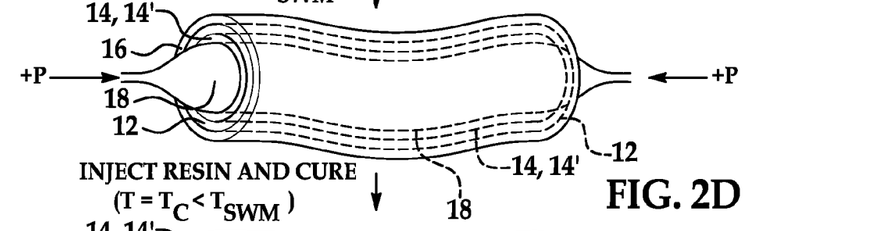
Figure 2E:
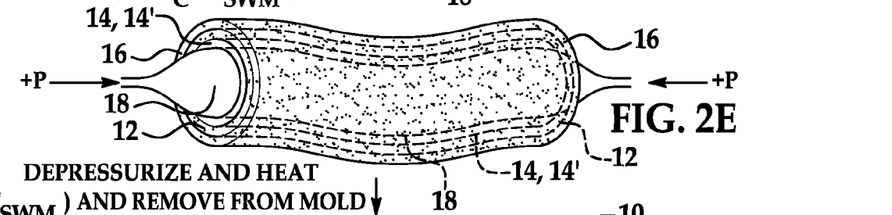

The mandrel 14 is heated to a temperature above its switching temperature $T_{SWM}$ while the flexible bladder 18 is pressurized (illustrated by +P), as shown in FIG. 2D. Such pressure may be applied via gas pressure, fluid pressure or via a mechanical force. The heat causes the mandrel 14 to be easily deformable and the pressure causes the flexible bladder 18 to expand, thereby forcing the deformed mandrel 14 to conform to the shape of the preform 12. When the mandrel 14 is pressed against the preform 12, the temperature is dropped to below the switching temperature $T_{SWM}$ of the mandrel 14 (and, preferably to below the curing temperature $T_C$ of the resin to be injected), thereby setting the temporary shape 14' of the mandrel 14. The pressure is maintained after the mandrel 14' is set in order to ensure that the perforations in the mandrel 14, 14' are obstructed by the expanded flexible bladder 18 during resin injection. This is shown in FIG. 2E. Since the expanded flexible bladder 18 is blocking the mandrel 14, 14' perforations, the mandrel 14, 14' and pressurized bladder 18 provide a substantially smooth surface against the preform 12. As such, the injected resin impregnates into the preform 12 and exhibits minimal, if any, protuberances. During resin injection, the temperature is maintained below a curing temperature $T_C$ of the material being injected. The injected resin is then cured at its curing temperature $T_C$, which is less than the switching temperature $T_{SWM}$ of the mandrel 14, 14'.

Figures 2F, 2G, 2H:
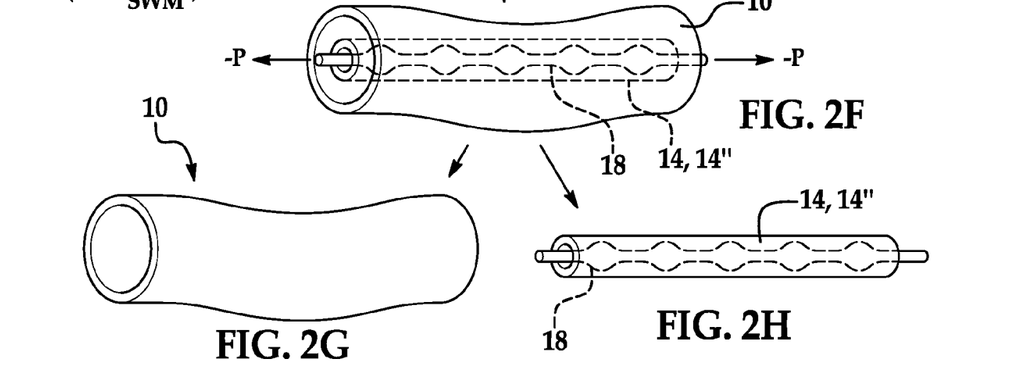

Once cured, the part 10 is removed from the external mold 16. The previously applied pressure is then removed (as indicated by –P in FIG. 2F). As a result, the flexible bladder 18 shrinks. The mandrel 14 is then heated to a temperature above its switching temperature $T_{SWM}$ so that it becomes easily deformable. Without the pressure from the bladder 18, the mandrel 14 recovers its permanent shrunken shape 14". The mandrel 14, 14" and bladder 18 are removed from the part 10, as shown in FIGS. 2G and 2H. It is to be understood that the mandrel 14 and bladder 18 may be used for preforming or molding another part 10 of the same or similar shape or of another complex shape.

While FIGS. 2A through 2D illustrate i) the insertion of the bladder 18 into the mandrel 14, 14", ii) the insertion of both 14, 18 into the preform 12, and iii) the subsequent heating of the mandrel 14 to achieve the temporary shape 14'; it is to be understood that the method may begin with the mandrel 14 (in its temporary shape 14' and having the bladder 18 therein) already in the preform 12 (as shown in FIG. 2D). Generally, this results when the mandrel 14 and bladder 18 are used in forming the preform 12 and are left in the preform 12 after it is formed.

As one example of such a preform formation process (not shown in the drawings), the mandrel 14 (in its permanent shrunken shape 14") having the flexible bladder 18 therein is inserted into an external mold having the predetermined preform shape. The mandrel 14 and flexible bladder 18 are then heated to a temperature that is above the switching temperature $T_{SWM}$ of the mandrel 14. This causes the mandrel 14 to be easily deformable. Pressure is applied to the inside of the flexible bladder 18, thereby causing the flexible bladder 18 to expand against the mandrel 14, which causes the mandrel 14 to conform to its surroundings, i.e., the inner surface of the external mold. As the mandrel 14 is pressed against the external mold, the temperature is then dropped to below the switching temperature $T_{SWM}$ of the mandrel 14. The pressure is maintained during this cooling process. Cooling the mandrel 14 in this manner sets the temporary shape 14' to the external mold shape, and thus the desirable preform 12 shape. The mandrel 14 in its set temporary shape 14' may then be removed from the external mold. The flexible bladder 18 is then depressurized and collapses within the mandrel 14, 14'. At this point, the mandrel 14 in its temporary shape 14' with the collapsed bladder therein 18 can be used to fabricate the preform 12 by one of the conventional preforming processes, such as directed fiber preforming or slurry preforming. At the end of this preforming process, it is to be understood that the mandrel 14, 14' and bladder 18 are within the preform 12.

The method may then continue by placing the preform 12 (having the mandrel 14, 14' and the bladder 18 therein) into another external mold 16 (as shown in FIG. 2E), which is used for molding. The bladder 18 is expanded, and the resin is injected and cured (as shown in FIG. 2E and previously described hereinabove). The mandrel 14 may recover its permanent shape 14" and be removed from the part 10 as described hereinabove.

Figure 3:
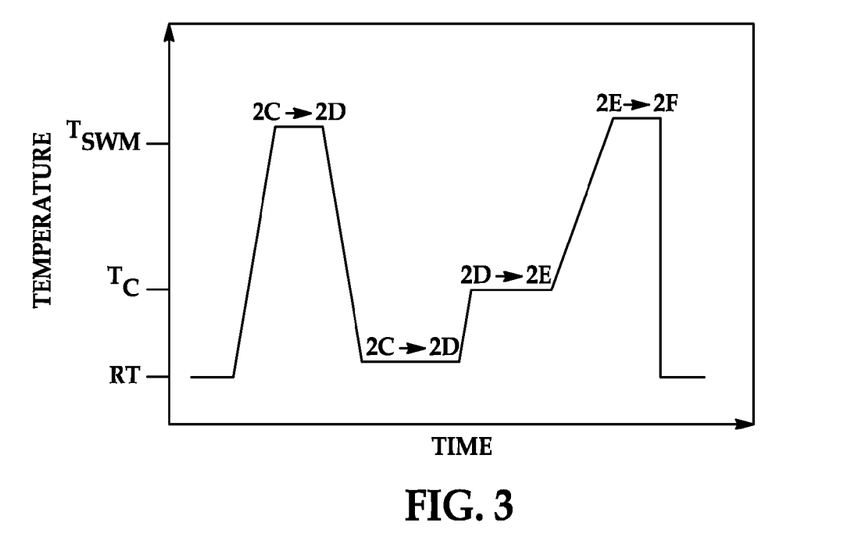
FIG. 3 is a graph depicting the temperature relationships between some of the steps of the method shown in FIGS. 2A through 2H.

FIG. 3 depicts increases and decreases in temperature over the process of forming the molded part 10 per the method of FIGS. 2A through 2H. As shown in the graph, the curing temperature $T_C$ of the resin used to form the part 10 is less than the switching temperature $T_{SWM}$ of the mandrel 14. As previously mentioned, the mandrel 14 does not deform at this curing temperature $T_C$. After curing, the temperature may again be increased above the switching temperature $T_{SWM}$ of the mandrel 14 in order to recover the permanent shape 14" of the mandrel 14 and remove it from the part 10. In this graph and the graphs shown in FIG. 5, it is to be understood that the actual temperatures may depend on the shape memory polymer(s) and resins used, and may extend above or below the indicated temperatures as much or as little as is desirable or necessary to achieve the desirable result. It is to be further understood that when cooling below the curing temperature $T_C$ is necessary or otherwise desirable, room temperature (RT) does not necessarily have to be obtained.

Figure 4A:
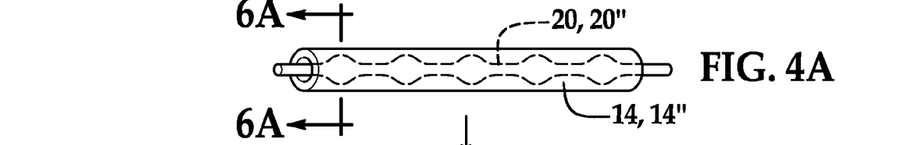
FIGS. 4A through 4I schematically depict an example of the method for molding using a preform having a perforated shape memory mandrel and a non-perforated shape memory polymer bladder therein.

Referring now to FIGS. 4A through 4I, another example of molding with a mandrel 14 and a bladder 20 is shown. In this example, the bladder 20 is a non-perforated shape memory polymer bladder 20. In this example, the permanent shape 20" of the shape memory polymer bladder 20 is the shrunken state, as shown in FIG. 4A. It is to be understood that the non-perforated shape memory polymer bladder 20 switching temperature $T_{SWB}$ is less than the switching temperature $T_{SWM}$ of the mandrel 14 (see FIG. 5). As such, while the shape memory polymer used for the bladder 20 and that used for the mandrel 14 may be of different chemistries, they may also be of a similar chemistry but have varying compositions. Therefore, both the bladder 20 and the mandrel 14 can be made of, for example, epoxy-, acrylate-, styrene-, or olefin-based systems or a combination thereof with varying compositions so as to target the appropriate switching temperature. For example, if acrylates are used for making both the bladder 20 and the mandrel 14, a cross-linking agent with a higher molecular weight may be used to reach a lower switching temperature for the bladder 20 than for the mandrel 14.

Figure 4B:
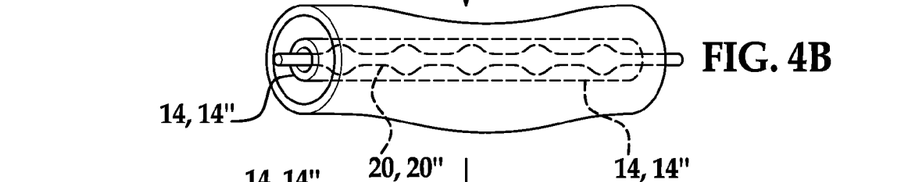
Figure 4C:
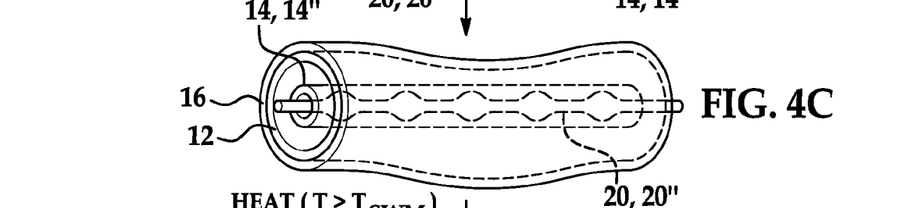

As shown in FIG. 4A, the shape memory bladder 20 (in its permanent shape 20") may be positioned in the mandrel 14 when in its permanent shape 14". The mandrel 14, 14" having the bladder 20, 20" therein is positioned within the preform 12, as shown in FIG. 4B. This assembly (preform 12, mandrel 14, 14" and bladder 20, 20") is then positioned within an external mold 16 having the predetermined part shape, as shown in FIG. 4C. The external mold 16 dimensions are configured such that the preform 12 is able to fit therein, and such that resin may be injected into the mold 16 so that it impregnates the preform 12.

Figure 4D:
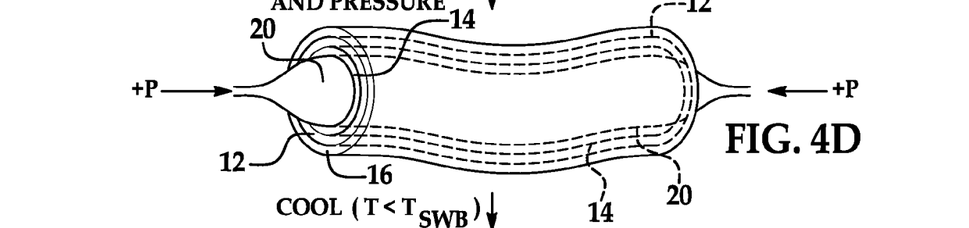
Figure 4E:
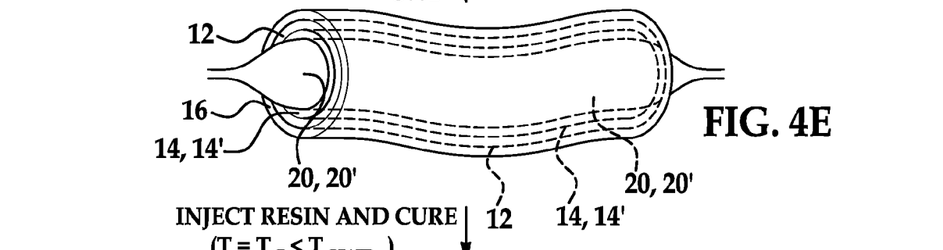
Figure 4F:
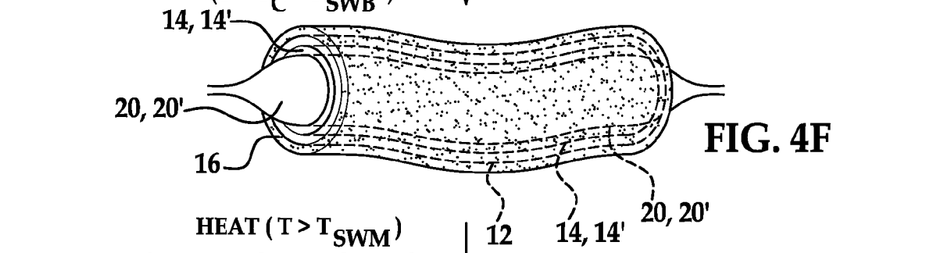

The mandrel 14 is heated to a temperature above its switching temperature $T_{SWM}$ while the shape memory polymer bladder 20 is pressurized (e.g., via gas, fluid or mechanical force, illustrated by +P), as shown in FIG. 4D. The heat and pressure cause both the mandrel 14 and the bladder 20 to deform and conform to the shape of the preform 12. When the mandrel 14 and bladder 20 have adopted the preform 12 shape, the temperature is dropped to below the switching temperature $T_{SWB}$ of the bladder 20, thereby setting/fixing the temporary shapes 14', 20' of both the mandrel 14 and bladder 20 (shown in FIG. 4E). In this example, since the bladder 20, 20' is fixed to be conformed to the temporary shape 14' of the mandrel 14 (and the preform 12 shape), the perforations of the mandrel 14 are substantially blocked by the bladder 20, and thus the pressure need not be maintained during resin injection. The mandrel 14, 14' and bladder 20, 20' provide a substantially smooth surface against the preform 12. As such, the injected resin impregnates into the preform 12 and exhibits minimal, if any, protuberances. The injected resin is then cured at a temperature $T_C$ that is less than the switching temperatures $T_{SWM}$, $T_{SWB}$ of both the mandrel 14, 14' and the bladder 20, 20'. Resin injection and curing are shown in FIG. 4F. It is to be understood that during resin injection, the temperature is maintained below the curing temperature $T_C$ to avoid premature curing of the resin.

Figures 4G, 4H, 4I:
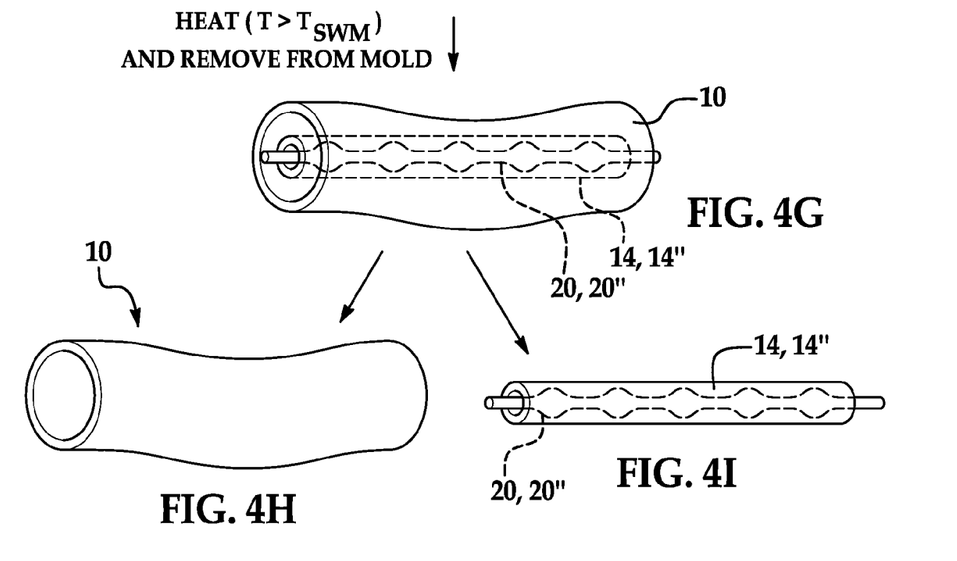

Once cured, the part 10 is removed from the external mold 16. The mandrel 14 and bladder 20 are then heated to a temperature above the switching temperature $T_{SWM}$ so that both the mandrel 14 and bladder 20 become deformable. The mandrel 14 and bladder 20 recover their respective permanent shrunken shapes 14", 20", as shown in FIG. 4G. The mandrel 14, 14" and bladder 20, 20" are removed from the part 10, as shown in FIGS. 4H and 4I. It is to be understood that the mandrel 14 and bladder 20 may be used for preforming or molding another part 10 of the same or similar shape or of another complex shape.

While FIGS. 4A through 4D illustrate i) the insertion of the bladder 20, 20" and the mandrel 14, 14" into the preform 12, and ii) the subsequent heating of the mandrel 14 and bladder 20 to achieve the temporary shapes 14', 20'; it is to be understood that the method may begin with the mandrel 14 in its temporary shape 14' and having the bladder 20, 20" therein already in the preform 12. Generally, this results when the mandrel 14 and bladder 20, are used in forming the preform 12 and are left in the preform 12 after it is formed.

As one example of this preform formation process (not shown in the Figures), the mandrel 14 is in its permanent shrunken shape 14" when the non-perforated shape memory polymer bladder 20, 20" is inserted therein. The mandrel 14, 14" having the shape memory polymer bladder 20 therein is inserted into an external mold having the predetermined preform shape. The mandrel 14 and shape memory polymer bladder 20 are then heated to a temperature that is above the switching temperature $T_{SWM}$ of the mandrel 14. Pressure is applied to the inside of the shape memory polymer bladder 20, thereby causing the bladder 20 to expand against the inner wall of the mandrel 14, and causing the deformable mandrel 14 to conform to its surroundings, i.e., the inner surface of the external mold. As the bladder 20 is pressed against the mandrel 14, and the mandrel 14 is pressed against the external mold, the temperature is then dropped to a temperature that is above the switching temperature $T_{SWB}$ of the bladder 20 and below the switching temperature $T_{SWM}$ of the mandrel 12. The pressure is maintained during cooling. Cooling the mandrel 14 in this manner sets the temporary shape 14' of the mandrel 14 to the external mold shape, and thus the desirable preform shape. Furthermore, at this temperature (above $T_{SWB}$ and below $T_{SWM}$), the bladder 20 is still in its low modulus state and can be depressurized, thereby causing the bladder 20 to revert back to its permanent shrunken shape 20". Once the bladder 20 is in its permanent shrunken shape 20", the temperature may again be lowered to below the switching temperature $T_{SWB}$ of the bladder 20. This temperature may be lowered to below the curing temperature of the material to be used to form the preform 12, so that the preform material does not prematurely cure. This sets the bladder 20 in this shrunken state/shape 20". At this point, the mandrel 14 in its temporary shape 14' with the collapsed bladder therein 20, 20" can be used to fabricate the preform 12 by one of the conventional preforming processes, such as directed fiber preforming or slurry preforming.

After this preforming process, the mandrel 14, 14' having the bladder 20, 20" therein remains in the preform 12. The method may then continue by placing the preform 12 (with mandrel 14, 14' and the bladder 20, 20" therein) into another external mold 16, which is used for molding. The temperature is raised to above the switching temperature $T_{SWB}$ of the bladder 20 and pressure is applied, thereby expanding the bladder 20 to its temporary shape 20', which obstructs the perforations of the mandrel 14, 14'. This structure is shown in FIG. 4D). The method may then continue with FIG. 4E, where the temperature is dropped to below the switching temperature $T_{SWB}$ of the bladder 20 and below the curing temperature $T_C$ of the resin to be injected in order to fix the bladder 20 in its temporary shape 20' and allow for resin injection without premature curing. As shown in FIG. 4F, the resin is then injected and cured. The mandrel 14 may recover its permanent shape 14" and be removed from the part 10 as described hereinabove.

Figure 5:
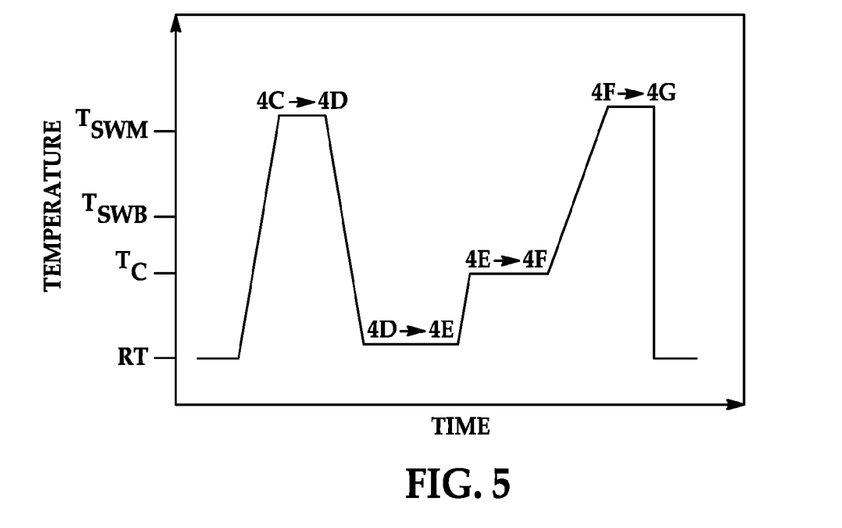
FIG. 5 is a graph depicting the temperature relationships between some of the steps of the method shown in FIGS. 4A through 4I.

FIG. 5 depicts increases and decreases in temperature over the process of forming the molded part 10 per the method of FIGS. 4A through 4I. As previously mentioned, when the method begins with the mandrel 14 in its temporary shape 14', the first heating step is above the switching temperature $T_{SWB}$ of the bladder 20 instead of above the switching temperature $T_{SWM}$ of the mandrel 14. This temperature difference results from the fact that the mandrel 14, 14' is already in the part shape, and thus need not be deformed.

As shown in FIG. 5, the curing temperature $T_C$ of the resin used to form the part 10 is less than the switching temperatures $T_{SWM}$, $T_{SWB}$ of both the mandrel 14 and the bladder 20. As previously mentioned, neither the mandrel 14 nor the bladder 20 deforms at this curing temperature $T_C$. After curing, the temperature may again be increased above the switching temperature $T_{SWM}$ of the mandrel 14 in order to recover the permanent shrunken shapes 14", 20" of the mandrel 14 and the bladder 20 for their removal from the part 10.

Referring now to FIG. 6A, a cross section (taken along the 6A-6A line of FIG. 4A) of the mandrel 14 in its permanent shape 14" having the non-perforated shape memory polymer bladder 20 therein is depicted. When both the mandrel 14 and the bladder 20, in this example, are in their shrunken shapes 14", 20", the perforations 22 of the mandrel 14 remain unobstructed. In this non-limiting example, the perforations 22 are tapered such that the opening diameter of the perforation 22 is larger on the inner surface IS of the mandrel 14 than on the outer surface OS. As previously mentioned, other suitable geometries may be utilized for the perforations 22.

An enlarged view of the mandrel 14 and bladder 20 of FIG. 6A is shown in FIG. 6B. As depicted, the bladder 20 generally does not engage the mandrel 14. After the temperature is raised above the switching temperature $T_{SWM}$ of the mandrel 14 and pressure is applied to the bladder 20, the bladder 20 deforms and is pressed against the inner surface IS of the mandrel 14, as shown in FIG. 6C. It is believed that the conformation of the bladder 20 (when deformed and pressurized) to the perforations 22 of the mandrel 14 in its temporary shape 14' (i.e., the part shape) during resin injection advantageously minimizes the formations of protuberances in the final molded part 10.

When the mandrel 14 is already in its temporary shape 14', the temperature is raised above the switching temperature $T_{SWB}$ of the bladder 20 in order to deform the bladder 20.

It is to be understood that the flexible bladder 18 also blocks the protuberances 22 of the mandrel 14 in a similar manner as shown in FIGS. 6B-6C.

While several embodiments have been described in detail, it will be apparent to those skilled in the art that the disclosed embodiments may be modified. Therefore, the foregoing description is to be considered exemplary rather than limiting.

The invention claimed is:

1. A molding method, comprising:
    inserting a preform having a predetermined part shape into an external mold having the predetermined part shape, the preform having therein:
        a perforated shape memory polymer mandrel in its temporary shape, the shape memory polymer mandrel having i) the predetermined part shape as the temporary shape and ii) a shrunken shape as its permanent shape, wherein the shrunken shape is configured such that it is removable from the predetermined part shape; and
        a bladder positioned within the perforated shape memory polymer mandrel;

configuring the bladder such that it substantially blocks perforations of the mandrel in its temporary shape;

injecting resin into the external mold between an inner surface of the external mold and an outer surface of the preform such that the resin impregnates the preform; and curing the injected resin, thereby forming a molded part.

2. The molding method as defined in claim 1, further comprising:

removing the external mold;

reconfiguring the bladder such that is does not substantially block the perforations of the mandrel in its temporary shape;

recovering the permanent shape of the mandrel; and removing the mandrel in its permanent shape and having the bladder therein from within the molded part.

3. The molding method as defined in claim 2, further comprising reshaping the shape memory polymer mandrel to its temporary shape using a forming die.

4. The method as defined in claim 1 wherein curing of the injected resin is accomplished at a temperature that is below a switching temperature of the perforated shape memory polymer mandrel and below a curing temperature of the injected resin.

5. The method as defined in claim 1 wherein the bladder is a flexible bladder, and wherein configuring the bladder is accomplished by pressurizing the flexible bladder, thereby blocking the perforations of the mandrel when the resin is injected.

6. The method as defined in claim 5 wherein the perforated shape memory polymer mandrel in its temporary shape and the flexible bladder are present in the preform as a result of a preforming process utilizing the perforated shape memory polymer mandrel having the flexible bladder therein.

7. The method as defined in claim 5 wherein the perforations of the mandrel have a predetermined geometry.

8. The method as defined in claim 1 wherein the bladder is a flexible bladder and wherein prior to inserting the preform into the external mold, the method further comprises:

inserting the flexible bladder into the mandrel when the mandrel is in its permanent shape; and inserting the mandrel, in its permanent shape and having the flexible bladder therein, into the preform.

9. The method as defined in claim 8 wherein perforations of the mandrel have a predetermined geometry.

10. The method as defined in claim 8 wherein after the preform is inserted into the external mold, the method further comprises:

heating the mandrel and flexible bladder to a temperature above a switching temperature of the mandrel;

pressurizing the flexible bladder while heating, thereby forcing the mandrel to conform to the predetermined preform shape, thereby adopting its temporary shape;

cooling the mandrel to a temperature below its switching temperature, thereby setting the temporary shape of the mandrel; and maintaining pressure inside the flexible bladder during injection and curing, whereby the flexible bladder substantially blocks perforations of the mandrel.

11. The method as defined in claim 10 wherein after the injected resin is cured, the method further comprises depressurizing the flexible bladder.

12. The method as defined in claim 1 wherein the bladder is a non-perforated shape memory polymer bladder and wherein prior to inserting the preform into the external mold, the method further comprises:

inserting the non-perforated shape memory polymer bladder in its permanent shrunken shape into the mandrel in its permanent shape; and inserting the mandrel, in its permanent shape and having the shape memory polymer bladder therein, into the preform.

13. The method as defined in claim 12 wherein a switching temperature of the perforated shape memory polymer mandrel is greater than a switching temperature of the shape memory polymer bladder, and wherein configuring the bladder is accomplished by:

heating the mandrel and bladder to a temperature that is above the switching temperature of the mandrel;

pressurizing the heated shape memory polymer bladder, thereby forcing the bladder and the mandrel to conform to inner dimensions of the preform thereby adopting their temporary shapes, which correspond with the predetermined part shape, wherein the temporary shape of the bladder substantially blocks perforations of the mandrel; and cooling the mandrel and bladder to a temperature that is below the switching temperature of bladder, thereby setting the temporary shapes of the mandrel and bladder.

14. The method as defined in claim 12 wherein perforations of the mandrel have a predetermined geometry.

15. The method as defined in claim 1 wherein the bladder is a non-perforated shape memory polymer bladder, wherein the shape memory polymer mandrel has therein the non-perforated shape memory polymer bladder in its permanent shrunken shape, wherein a switching temperature of the perforated shape memory polymer mandrel is greater than a switching temperature of the bladder, and wherein configuring the bladder is accomplished by:

heating the bladder to a temperature that is above its switching temperature;

pressurizing the heated shape memory polymer bladder, thereby forcing the bladder to conform to the shape memory polymer mandrel in its temporary shape and to adopt its temporary shape, and wherein the temporary shape of the bladder substantially blocks perforations of the mandrel; and cooling the bladder to a temperature that is below its switching temperature, thereby setting the temporary shape of the bladder.

16. The method as defined in claim 15 wherein the perforated shape memory polymer mandrel in its temporary shape and the non-perforated shape memory polymer bladder in its permanent shrunken shape are present in the preform as a result of a preforming process utilizing the perforated shape memory polymer mandrel having the non-perforated shape memory polymer bladder therein.

17. The method as defined in claim 15 wherein the mandrel perforations have a predetermined geometry.

* * * * *